United States Patent [19]

Piber

[11] Patent Number: 4,559,016
[45] Date of Patent: Dec. 17, 1985

[54] MOUNTING AND COOLING ARRANGEMENT FOR SEMICONDUCTOR SWITCH OF AN ELECTRIC OUTBOARD MOTOR

[75] Inventor: Earl T. Piber, Oconomowoc, Wis.
[73] Assignee: Eaton Corporation, Cleveland, Ohio
[21] Appl. No.: 605,458
[22] Filed: Apr. 30, 1984
[51] Int. Cl.[4] ............................................. B63H 21/26
[52] U.S. Cl. .................................... 440/6; 310/54; 310/87
[58] Field of Search .................... 440/6, 7; 310/54, 87

[56] References Cited

U.S. PATENT DOCUMENTS

| | | | |
|---|---|---|---|
| 2,116,146 | 5/1938 | Gondek | 440/6 |
| 3,791,331 | 2/1974 | Dilley | 440/6 |
| 3,906,887 | 9/1975 | Kappas | 115/18 E |
| 3,954,081 | 5/1976 | Blake | 115/18 E |
| 4,075,970 | 2/1978 | Blake et al. | 115/18 E |
| 4,362,512 | 12/1982 | Johnson | 440/6 |

Primary Examiner—Sherman D. Basinger
Attorney, Agent, or Firm—C. H. Grace; L. G. Vande Zande

[57] ABSTRACT

A transistor (20) is mounted to a plug-in socket (22) and this assembly is in turn attached by a bolted (24) connection to a heat sink (18) which is slidably inserted within a housing (16) open to a bottom side and attached to a vertical tube (10) of an electric outboard motor near the lower unit (6) thereof and has its electrical connections (22d, 22e) with a multiwire conductor (26) sealed (27) in a watertight manner, the conductor extending through an opening (10a) in the sidewall of the tube (10) to the interior of the tube for connection with an upper unit (2) of the motor, the conductor (26) and sidewall opening (10a) also being sealed (28) in a watertight manner.

7 Claims, 5 Drawing Figures

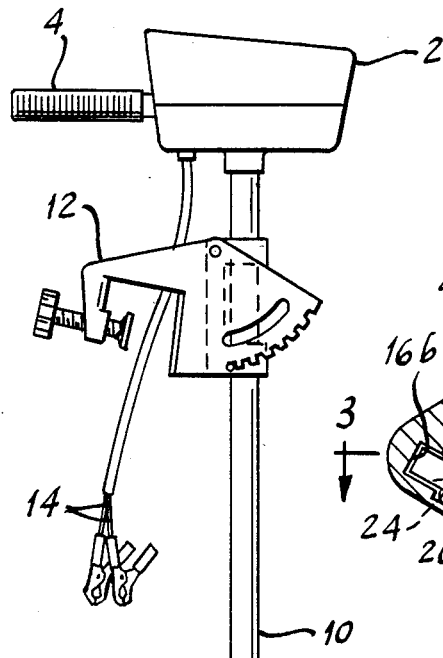
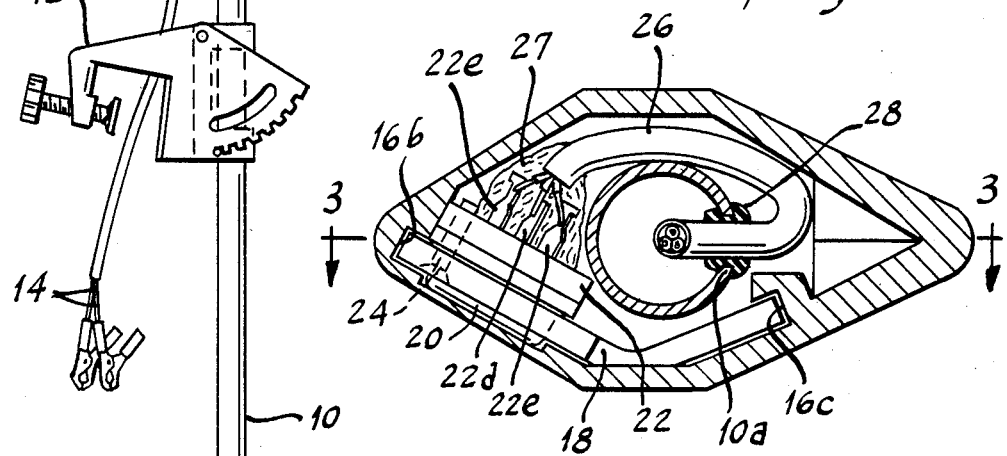
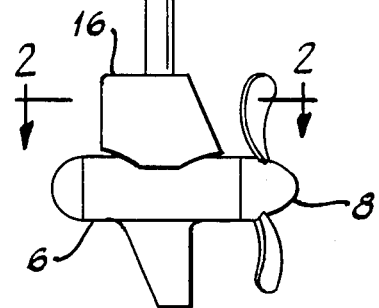
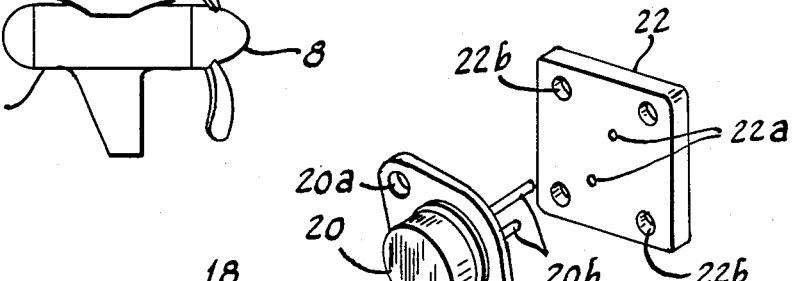
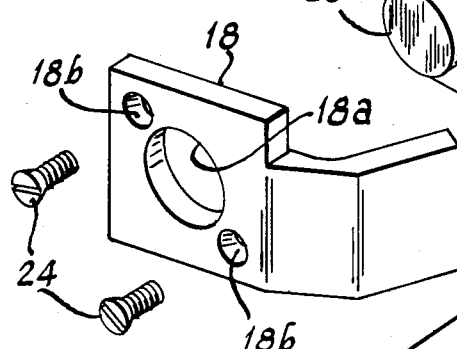
Fig. 1
Fig. 2
Fig. 5

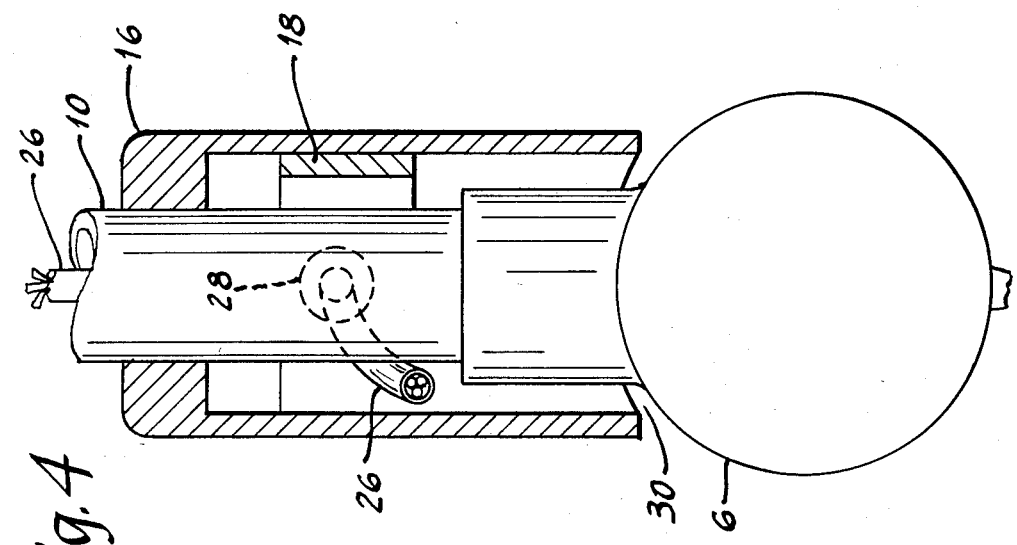
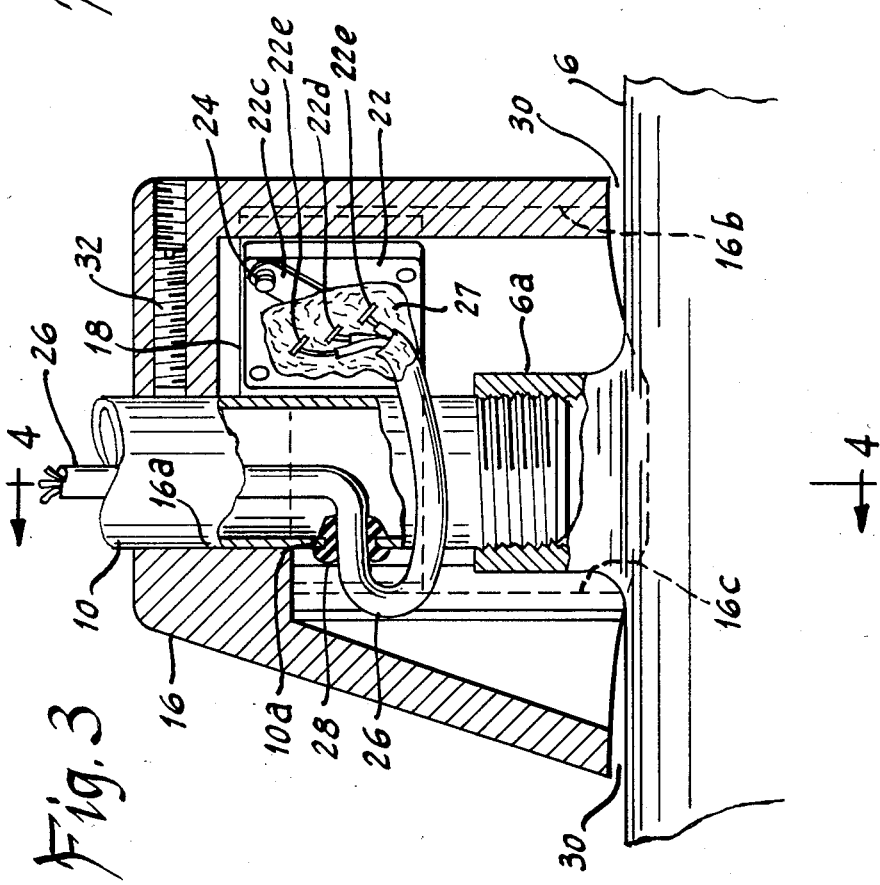

MOUNTING AND COOLING ARRANGEMENT FOR SEMICONDUCTOR SWITCH OF AN ELECTRIC OUTBOARD MOTOR

BACKGROUND OF THE INVENTION

This invention relates to electrically powered outboard motors, particularly to such motors that include electronic control for varying the speed of the motor. More particularly, the invention relates to an improved arrangement for cooling a power switching semiconductor of an electronic control for such motors, and a mounting structure therefor which is readily adaptable and usable with a variety of electric outboard motors.

Electronic control systems for controlling the speed of an electric motor are well known. Such systems generally incorporate a manually controlled potentiometer for varying the control signal to a semiconductor switch. In one form of control the emitter and collector of a power switching transistor are connected in series with the motor and the potentiometer is connected to the base of the transistor to regulate current flow through the transistor to the motor. In another form of control, a thyristor switching device such as a silicon controlled rectifier has its anode and cathode connected in series circuit with the motor and the potentiometer is connected in a resistor-capacitor (RC) timing circuit to vary the conduction period of the silicon controlled rectifier thereby to control the voltage applied to the motor windings. In either circuit embodiment, the power switching device generates significant heat which must be dissipated to protect the control components.

Control schemes of the aforementioned type utilized in electric outboard motors commonly locate the power switching semiconductor switch within the watertight housing of the lower drive unit of the outboard motor wherein heat given off by the semiconductor switch is transferred to the housing. When the motor is operating in a submersed condition, heat is conducted away from the housing by the water. When the motor is operated out of the water, the housing serves as a heat sink which distributes the heat over a larger surface and dissipates it to the air.

While the aforementioned embodiments are suitable for their intended purpose, there are disadvantages associated therewith. One disadvantage is that the interior of the motor housing must be structured to provide space for mounting the semiconductor switch therein. Another disadvantage is that heat generated by the semiconductor switch within the sealed housing of the lower unit is additive to heat generated by the motor. If the motor is operated for a substantial period of time in a non-submersed condition, the motor housing may not be an adequate heat sink to dissipate the combined heat to air, thereby entrapping potentially damaging heat within the housing.

SUMMARY OF THE INVENTION

This invention provides a mounting and cooling arrangement for a semiconductor switch of an electronic speed control for a variable speed electric outboard motor which may be directly utilized in conjunction with a majority of present design electric outboard motor embodiments. This mounting and cooling arrangement includes a housing which is attached to the outboard motor near the lower drive unit thereof to normally be submersed when the motor is operated in a position for powering a boat. Electrical connections to the semiconductor switch are sealed to be watertight. The housing is constructed to permit water to enter therein for contact with the semiconductor switch, thereby enabling the semiconductor switch to dissipate heat directly to the water when operated in a submersed condition. A heat sink is also provided within the housing, the semiconductor switch being mounted thereon for dissipating heat when the motor is run in a non-submersed condition. The invention provides improved heat dissipation for the semiconductor switch and may be utilized without modifying the interior of the lower unit of the outboard motor. These and other advantages of the invention will be more readily understood when reading the following description and claims in conjunction with the accompanying drawings.

BRIEF DESCRIPTION OF THE DRAWINGS

FIG. 1 is a side elevational view of an electric outboard motor embodying this invention;

FIG. 2 is a cross sectional view taken along the line 2—2 of FIG. 1;

FIG. 3 is a cross sectional view taken along the line 3—3 of FIG. 2;

FIG. 4 is a cross sectional view taken along the line 4—4 of FIG. 3; and

FIG. 5 is an exploded isometric view of a semiconductor switch, socket and heat sink utilized in this invention.

DESCRIPTION OF THE PREFERRED EMBODIMENT

Referring to the drawings, and particularly to FIG. 1, there is shown an electric outboard motor comprising an upper controller unit 2 having a control mast 4 extending forwardly therefrom, a watertight lower unit 6 which includes an electric motor and shaft (not shown) for driving a propeller 8. Upper unit 2 and lower unit 6 are joined together by a hollow tube 10. Tube 10 is adjustable vertically within a clamping structure 12 for attaching the motor to the transom of a boat. In a known manner, clamp 12 is angularly adjustable to vary the vertical positioning of the motor with respect to the boat and to the water. A pair of electric conductor leads 14 extend from the upper controller unit 2 for connection of the outboard motor to a source of electrical power. Controller unit 2 may further comprise an ON-/OFF switch for connecting the motor of lower unit 6 to the source of electrical power, and a potentiometer and electronic circuitry for controlling the speed of the motor of lower unit 6. The potentiometer may have a separate knob mounted on the face of upper unit 2 or may be incorporated in the control mast 4. The semiconductor switch mounting and cooling housing 16 of this invention is shown in FIG. 1 mounted to tube 10 adjacent lower unit 6.

As seen best in FIG. 3, tube 10 has a threaded lower end which may be coated with a suitable watertight sealant and is threadably engaged within an internally threaded hub 6a of lower unit 6. Housing 16 is a hollow structure open along the bottom edge thereof and having a cylindrical opening 16a in an upper wall for receiving tube 10 therein. The enclosure may be assembled loosely on tube 10 prior to attaching either the upper unit 2 or the lower unit 6 thereto. Referring also to FIG. 2, the interior of housing 16 is provided with a pair of vertically extending grooves 16b and 16c for slidably receiving a shallow V-shaped heat sink 18 from the open bottom edge. Heat sink 18 is best shown in FIG. 5 wherein it can be seen that the heat sink has a large circular opening 18a formed in one end thereof flanked by a pair of diagonally located counter-sunk holes 18b. A power switching semiconductor switch such as a transistor 20 or the like is positioned against the inside surface of the V-shaped heat sink such that the circular portion of the transistor projects through the opening 18a. Transistor 20 is also provided with mounting holes 20a which are correspondingly aligned with holes 18b in the heat sink. A transistor mounting socket 22 is also provided, the socket having holes 22a for receiving and making electrical connection with the emitter and collector wires 20b of the transistor in a plug-in manner. The socket 22 is also provided with a pair of diagonally oriented holes 22b which are aligned with the holes 18b and 20a beforedescribed. As seen partially in FIG. 3, the socket 22 has a conductor strap 22c which extends between the holes 22b on the back side of the socket, the strap 22c having holes therein aligned with the holes 22b for threadably engaging screws 24. This engagement of the screws 24 with the conductor strap 22c forms an electrical connection between the base of the transistor 20 and the conductor strap 22c on the back of the socket. A center wiring terminal 22d is attached to strap 22c, and outer wiring terminals 22e are connected to plug-in sockets for the emitter and collector leads 20b of transistor 20. The transistor 20 is assembled to the socket 22 and this subassembly is non-positioned against the inside face of heat sink 18 and secured thereto by the screws 24.

As seen in FIG. 3, a three-wire conductor 26 extends down the center of hollow tube 10 from the upper controller unit 2. An aperture 10a is formed in a sidewall of the tube 10 near the point of connection of tube 10 with hub 6a of lower unit 6. Conductor 26 is brought out exteriorly of tube 10 through the aperture 10a. A rubber sealing grommet 28 is disposed over the conductor 26 and inserted within the aperture 10a to provide a watertight seal between the conductor 26 and the aperture 10a of tube 10. The three-wires of conductor 26 are attached to the wiring terminals 22d and 22e of transistor socket 22 by soldering or the like. After connection of the wires to the socket terminals, these connections are encased in a watertight sealing substance such as RTV sealant 27 which is applied to the back of the socket around the respective terminals and over the insulating covering of the conductor 26 to form a watertight connection between these members. After the electrical connections have been made and sealed as aforedescribed, the heat sink and its assembled transistor and transistor socket are slid upwardly into the grooves 16b and 16c of the housing 16. The heat sink 18 and the grooves 16b and 16c are formed to provide a tapering interference fit between the members so that the heat sink, when pressed into place, may be retained within the housing 16. The housing is then positioned with respect to the lower unit 6 such that a small gap 30 exists between the lower edge of housing 16 and the profile of the lower unit 6. A set screw 32 is provided in the upper wall of housing 16 to be tightened against the exterior surface of tube 10 for securing the housing 16 in place with respect to the lower unit.

When so assembled, heat generated by the transistor 20 is absorbed by the heat sink 18 and by virtue of its contact with housing 16 is dissipated to the housing and to the air or water depending upon the condition in which the outboard motor is being operated. In addition, when the motor is operated in a submersed position in water, water may flow through the gap 30 into the interior of the housing 16 to surround the transistor and its heat sink and socket to directly dissipate heat from these elements to the water, thereby providing an effective cooling medium for the transistor. If desired, the housing may be provided with additional holes in the sidewalls thereof to facilitate water flow therethrough.

While the invention hereinbefore described represents a preferred embodiment thereof, it is to be understood that it is susceptible to various modifications without departing from the scope of the appended claims.

I claim:

1. In an electric outboard motor having an upper controller unit and a submersible watertight lower drive unit joined together by a hollow tube, said lower unit comprising a watertight housing mounted on an end of said tube and having an electric motor in said housing and said controller unit having control means for varying the speed of said motor, the improvements comprising:

a watertight semiconductor switch for said control means;

means attached to said tube externally of said lower unit for mounting said semiconductor switch in proximity to said lower unit externally thereof;

an aperture in a sidewall of said tube proximate said mounting means;

conductor means within said tube and extending externally thereof through said aperture for electrically connecting said semiconductor switch to said control means; and first sealing means for effecting a watertight seal between said conductor means and said tube and second sealing means disposed over electrical connections of said conductor means to said semiconductor switch for rendering said connections watertight.

2. The invention defined in claim 1 wherein said mounting means comprises a heat sink, said semiconductor switch being mounted on said heat sink.

3. The invention defined in claim 2 wherein said mounting means comprises a non-watertight second housing distinct from said lower unit, said second housing being attached to said tube wherein said tube extends substantially through said second housing to said watertight housing of said lower unit, said heat sink and said semiconductor switch being received in said second housing in thermal contact therewith.

4. The invention defined in claim 3 wherein said first sealing means effect a watertight seal between said conductor means and said tube at said aperture.

5. The invention defined in claim 4 wherein said second housing is hollow and open at one side; said one side being disposed adjacent said lower unit and configured to substantially conform to a profile of said lower unit at a juncture of said second housing and said lower unit.

6. The invention defined in claim 5 wherein said juncture is non-watertight.

7. An add-on power switching semiconductor switch assembly for an electric outboard motor having an upper controller unit and a submersible watertight lower drive motor unit joined by a hollow tube and control means in said controller unit for varying the speed of said motor, said assembly comprising, in combination:

a non-watertight housing distinct from said lower unit disposed on said tube proximate said lower unit;

a heat sink having a semiconductor switch mounted thereon positioned in said housing in thermal engagement therewith;

conductor means electrically connected to said semiconductor switch extending into said tube through an opening in a sidewall thereof, said opening being disposed within said housing and said conductor means extending through said tube to said control means; and sealing means for effecting a watertight seal of said electrical connection of said conductor means to said semiconductor switch and said conductor means within said opening.

* * * * *